United States Patent
Kuo et al.

(10) Patent No.: US 12,487,144 B2
(45) Date of Patent: Dec. 2, 2025

(54) LEAKAGE DETECTING ASSEMBLY AND SHEET LEAKAGE DETECTING MODULE

(71) Applicant: XINTEC INC., Taoyuan (TW)

(72) Inventors: Jui Yi Kuo, Taoyuan (TW); Chung Yu Li, Taoyuan (TW); Yi Fan Hu, Taoyuan (TW)

(73) Assignee: XINTEC INC., Taoyuan (TW)

( * ) Notice: Subject to any disclaimer, the term of this patent is extended or adjusted under 35 U.S.C. 154(b) by 323 days.

(21) Appl. No.: 18/175,416

(22) Filed: Feb. 27, 2023

(65) Prior Publication Data

US 2023/0280231 A1    Sep. 7, 2023

(30) Foreign Application Priority Data

Mar. 4, 2022  (TW) .................................. 111108072

(51) Int. Cl.
*G01M 3/04*    (2006.01)

(52) U.S. Cl.
CPC ..................... *G01M 3/04* (2013.01)

(58) Field of Classification Search
CPC ..... F16L 2201/30; F16L 55/1022; F16L 9/18; F17D 5/06; G01M 3/18; G01M 3/183; G01M 3/283; G01M 3/04; G08B 21/18; G06Q 20/00; G06Q 20/3829; G06Q 20/40

USPC .......................................................... 73/40.5
See application file for complete search history.

(56) References Cited

U.S. PATENT DOCUMENTS

| | | | | |
|---|---|---|---|---|
| 4,673,926 A | * | 6/1987 | Gorman | G01M 3/045 73/40.5 R |
| 5,343,191 A | * | 8/1994 | McAtamney | G01M 3/283 73/40.5 R |
| 2018/0024024 A1 | * | 1/2018 | Wirfalk | G01M 3/183 340/605 |
| 2019/0323919 A1 | * | 10/2019 | Fung-A Wing | E03B 7/07 |

FOREIGN PATENT DOCUMENTS

| | | |
|---|---|---|
| CN | 105736953 A | 7/2016 |
| CN | 109115839 A | 1/2019 |
| CN | 109764249 A | 5/2019 |
| JP | S57-128836 A | 8/1982 |

\* cited by examiner

*Primary Examiner* — Kristina M Deherrera
*Assistant Examiner* — Gedeon M Kidanu
(74) *Attorney, Agent, or Firm* — LIU & LIU

(57) ABSTRACT

A leakage detecting assembly includes a sheet leakage detecting module, a signal output unit, and a monitoring control system. The sheet leakage detecting module covers a wielding area or a connection area of a pipeline, and surrounds the pipeline. The sheet leakage detecting module is in direct contact with an outer surface of the pipeline. The signal output unit is electrically connected to the sheet leakage detecting module. The monitoring control system is electrically connected to the signal output unit.

13 Claims, 9 Drawing Sheets

LEAKAGE DETECTING ASSEMBLY AND SHEET LEAKAGE DETECTING MODULE

RELATED APPLICATIONS

This application claims priority to Taiwan Application Serial Number 111108072, filed Mar. 4, 2022, which is herein incorporated by reference.

BACKGROUND

Field of Invention

The present disclosure relates to a leakage detecting assembly, especially relates to a leakage detecting assembly which is used for a pipe.

Description of Related Art

With the advancement of semiconductor manufacturing process, the price of current semiconductor equipment is expensive. If the gas pipeline or liquid pipeline connected to the semiconductor equipment indirectly causes damage to the semiconductor equipment or contamination of the semiconductor products in the semiconductor equipment due to construction or various external factors, it will seriously affect the output and yield of the products.

Generally speaking, gas or liquid leak detection for a pipeline has the following disadvantages. For example, the leak detection of the pipeline does not immediately perform the real-time detection of the welding area or the joint area on the pipeline with the supply pressure, so the initial micro leak cannot be reacted in advance. In addition, the detector is placed on a platform near the pipeline, which is plane detection and can only detect micro leak in a large area of gas or liquid. When the detector detects a gas or liquid leak, it is likely that damage has occurred to the semiconductor equipment or to the products within the semiconductor equipment. Moreover, the pipeline in an uneven area and a complex environment may have less space, and it is not easy to detect leaks by daily inspection.

SUMMARY

One aspect of the present disclosure provides a leakage detecting assembly.

According to some embodiments of the present disclosure, a leakage detecting assembly includes a sheet leakage detecting module, a signal output unit, and a monitoring control system. The sheet leakage detecting module covers a welding area or a connection area of a pipeline, and surrounds the pipeline. The sheet leakage detecting module is in direct contact with an outer surface of the pipeline. The signal output unit is electrically connected to the sheet leakage detecting module. The monitoring control system is electrically connected to the signal output unit.

In some embodiments, the sheet leakage detecting module includes an isolation layer and a plurality of leakage detectors. The isolation layer surrounds the welding area or the connection area of the pipeline. The leakage detectors are arranged in the isolation layer in an array arrangement.

In some embodiments, the isolation layer surrounds the leakage detectors.

In some embodiments, a material of the isolation layer is silicone.

In some embodiments, the isolation layer has an inner surface and an outer surface, the inner surface of the isolation layer has a plurality of recesses, and the leakage detectors are respectively in the recesses and are covered by the outer surface of the isolation layer.

In some embodiments, the recesses of the isolation layer are arranged in an array arrangement.

In some embodiments, the isolation layer has an inner surface and an outer surface opposite to the inner surface, and has a plurality of openings through the inner surface and the outer surface of the isolation layer, and the leakage detectors are respectively in the openings.

In some embodiments, the openings of the isolation layer are arranged in an array arrangement.

In some embodiments, the leakage detectors are exposed through the outer surface of the isolation layer.

In some embodiments, the leakage detecting assembly further includes an Ethernet device electrically connected to the signal output unit and the monitoring control system.

Another aspect of the present disclosure provides a sheet leakage detecting module.

According to some embodiments of the present disclosure, a sheet leakage detecting module includes an isolation layer and a plurality of leakage detectors. The isolation layer surrounds a welding area or a connection area of a pipeline, wherein the isolation layer is in direct contact with an outer surface of the pipeline. The leakage detectors arranged in the isolation layer in an array arrangement.

In some embodiments, the isolation layer surrounds the leakage detectors.

In some embodiments, a material of the isolation layer is silicone.

In some embodiments, the isolation layer has an inner surface and an outer surface, the inner surface of the isolation layer has a plurality of recesses, and the leakage detectors are respectively in the recesses and are covered by the outer surface of the isolation layer.

In some embodiments, the recesses of the isolation layer are arranged in an array arrangement.

In some embodiments, the isolation layer has an inner surface and an outer surface opposite to the inner surface, and has a plurality of openings through the inner surface and the outer surface of the isolation layer, and the leakage detectors are respectively in the openings.

In some embodiments, the openings of the isolation layer are arranged in an array arrangement.

In some embodiments, the leakage detectors are exposed through the outer surface of the isolation layer.

In the aforementioned embodiments of the present disclosure, since the leakage detecting assembly has the sheet leakage detecting module and the sheet leakage detecting module can surround the pipeline and cover the welding area or the connection area of the pipeline, an area where the pipeline is more likely to leak under pressure can be detected in real time, which can effectively respond to the micro leak of the pipeline in an early stage. Furthermore, the sheet leakage detecting module is in direct contact with the outer surface of the pipeline, not separated from the pipeline, and thus the sheet leakage detecting module is capable of three-dimensional (3D) surface detection. When the sheet leakage detecting module detects a gas or liquid leak, inspections and repairs may be performed as soon as possible to avoid damage to semiconductor equipment or products in the semiconductor equipment. In addition, since the signal output unit is electrically connected to the sheet leakage detecting module and the monitoring control system, leakage can be detected by the monitoring system without relying on daily inspection of the pipeline, which is beneficial to detect the pipeline in an uneven area and small space with a complex environment. Through the sheet leakage detecting module, the monitoring control system may receive feedback signals and precisely locate a leak, such that the leak can be dealt with immediately to reduce damage. Moreover, the leakage detecting assembly may detect gas or liquid leaks of delivery pipelines with various sizes and are widely used.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
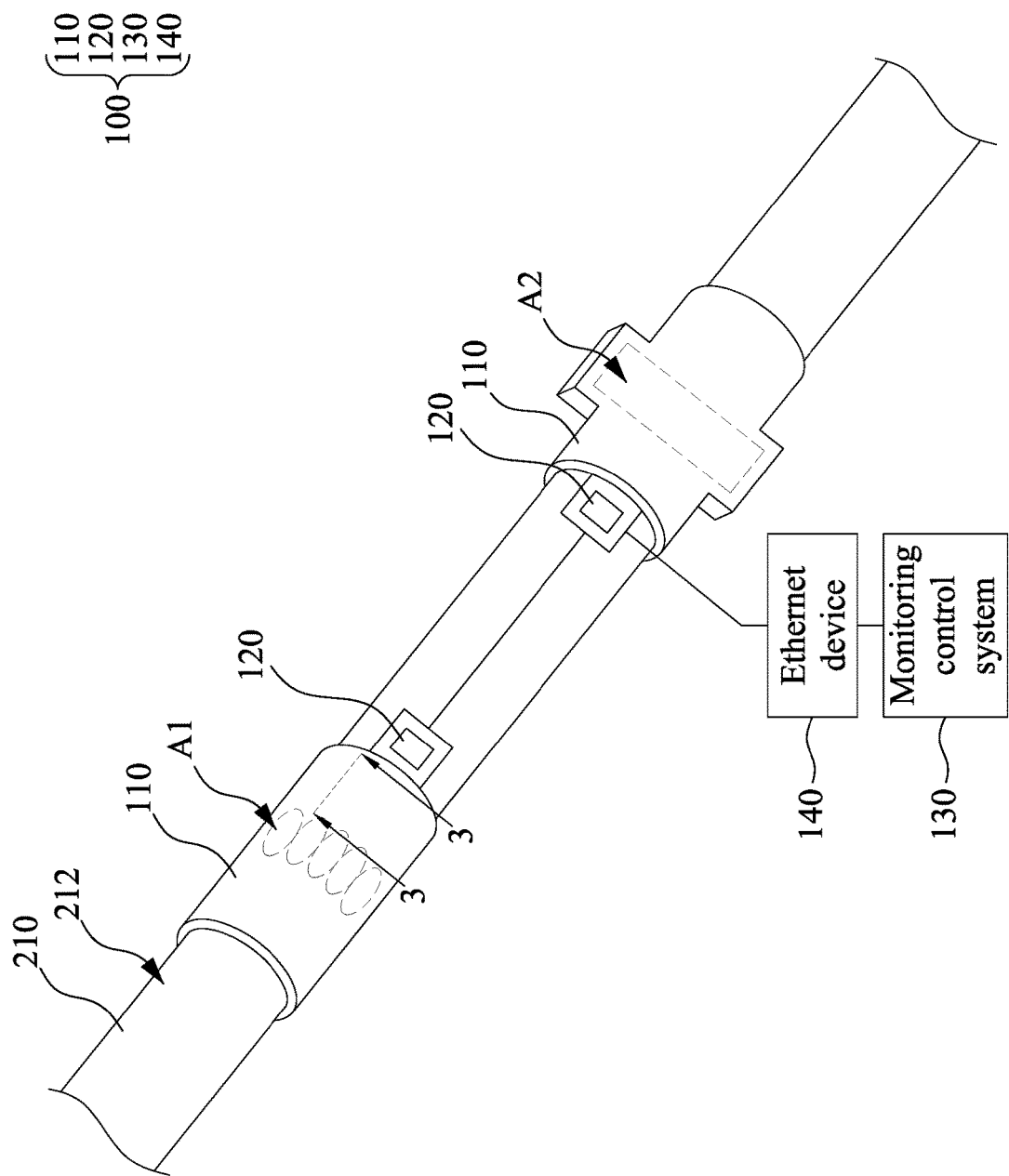
FIG. 1 is a schematic view of a leakage detecting assembly according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
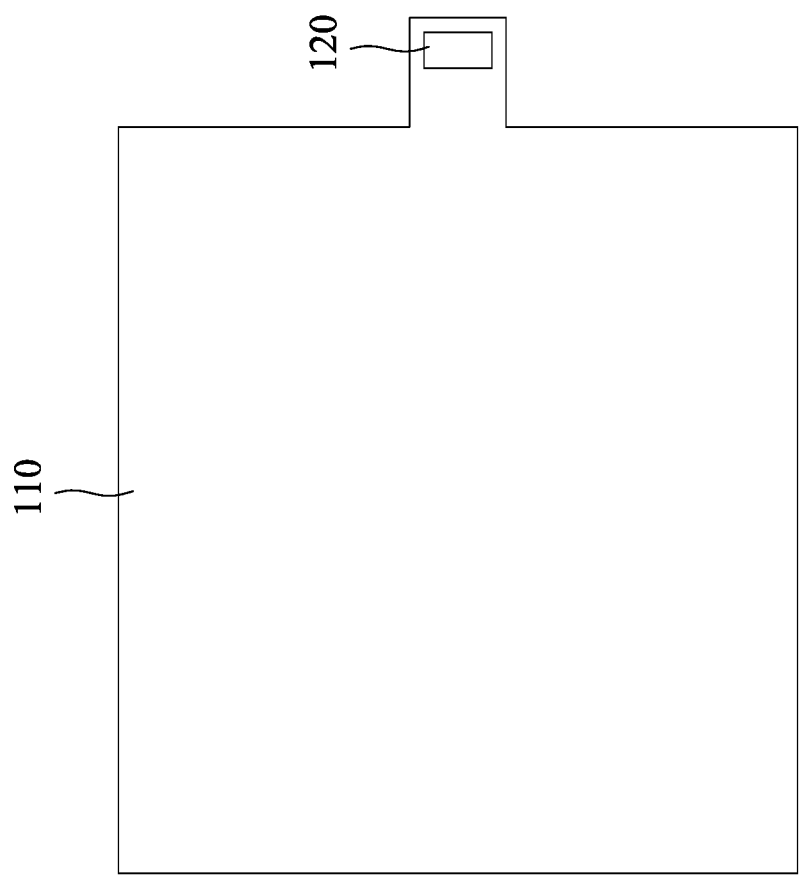
FIG. 2 is a top view of a sheet leakage detecting module of FIG. 1 after being unfolded.

FIG. 1 is a schematic view of a leakage detecting assembly 100 according to one embodiment of the present disclosure. FIG. 2 is a top view of a sheet leakage detecting module 110 of FIG. 1 after being unfolded. As shown in FIG. 1 and FIG. 2, the leakage detecting assembly 100 includes the sheet leakage detecting module 110, a signal output unit 120, and a monitoring control system 130. A single sheet leakage detecting module 110 may cover a welding area A 1 or a connection area A 2 of a pipeline 210. In this embodiment, there are two sheet leakage detecting modules 110 respectively cover the welding area A 1 and the connection area A 2 of the pipeline 210. The sheet leakage detecting module 110 surrounds the pipeline 210. The sheet leakage detecting module 110 is in direct contact with an outer surface 212 of the pipeline 210. The signal output unit 120 is electrically connected to the sheet leakage detecting module 110. The monitoring control system 130 is electrically connected to the signal output unit 120.

In this embodiment, the entire sheet leakage detecting module 110 may be a leakage detector used to detect gas or liquid leaking from the wielding welding area A 1 and the connection area A 2 of the pipeline 210. The monitoring control system 130 may be a supervisory control and data acquisition (SCADA) system.

Since the leakage detecting assembly 100 has the sheet leakage detecting module 110 and the sheet leakage detecting module 110 can surround the pipeline 210 and cover the welding area A 1 or the connection area A 2 of the pipeline 210, an area where the pipeline 210 is more likely to leak under pressure can be detected in real time, which can effectively respond to the micro leak of the pipeline 210 in an early stage. Furthermore, the sheet leakage detecting module 110 is in direct contact with the outer surface 212 of the pipeline 210, not separated from the pipeline 210, and thus the sheet leakage detecting module 110 is capable of three-dimensional (3D) surface detection. When the sheet leakage detecting module 110 detects a gas or liquid leak, technicians may inspect and repair the pipeline 210 as soon as possible to avoid damage to semiconductor equipment or products in the semiconductor equipment.

In addition, since the signal output unit 120 is electrically connected to the sheet leakage detecting module 110 and the monitoring control system 130, leakage can be detected by the monitoring system 130 without relying on personnel daily inspection of the pipeline 210, which is beneficial to detect the pipeline 210 in an uneven area and small space with a complex environment. Through the sheet leakage detecting module 110, the monitoring control system 130 may receive feedback signals and precisely locate a leak, such that technicians can deal with the leak immediately to reduce damage. Moreover, the leakage detecting assembly 100 may detect gas or liquid leaks of delivery pipelines 210 with various sizes and are widely used.

In some embodiments, the leakage detecting assembly 100 further includes an Ethernet device 140. The Ethernet device 140 is electrically connected to the signal output unit 120 and the monitoring control system 130. The monitoring control system 130 can obtain which sheet leakage detecting module 110 on the pipeline 210 detects the leakage through the Ethernet device 140.

Figure 3:
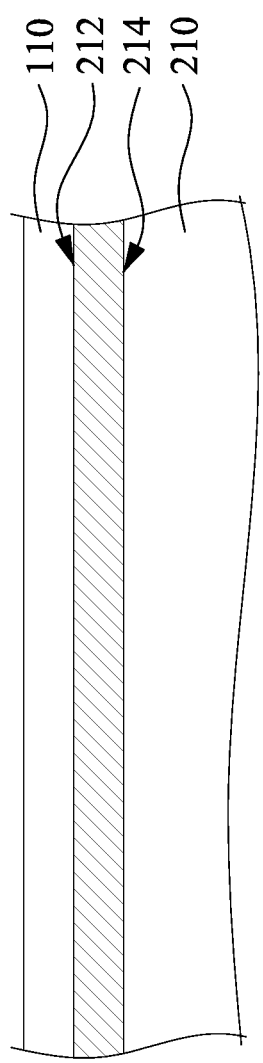
FIG. 3 is a cross-sectional view of the sheet leakage detecting module and a pipeline taken along line 3-3 of FIG. 1.

FIG. 3 is a cross-sectional view of the sheet leakage detecting module 110 and the pipeline 210 taken along line 3-3 of FIG. 1. As shown in FIG. 2 and FIG. 3, the sheet leakage detecting module 110 is disposed along a portion of the outer surface 212 of the pipeline 210, and is in direct contact with the outer surface 212 of the pipeline 210. The slashed part in FIG. 3 is referred to as the pipe wall of the pipeline 210 (i.e., a body between the outer surface 212 and an inner surface 214 of the pipeline 210). When gas or liquid leaks from the pipe wall of the pipeline 210, the sheet leakage detecting module 110 in contact with the outer surface 212 of the pipeline 210 can immediately detect the leak.

It is to be noted that the connection relationships, the materials, and the advantages of the elements described above will not be repeated in the following description. In the following description, other types of sheet leakage detecting modules will be described.

Figure 4:
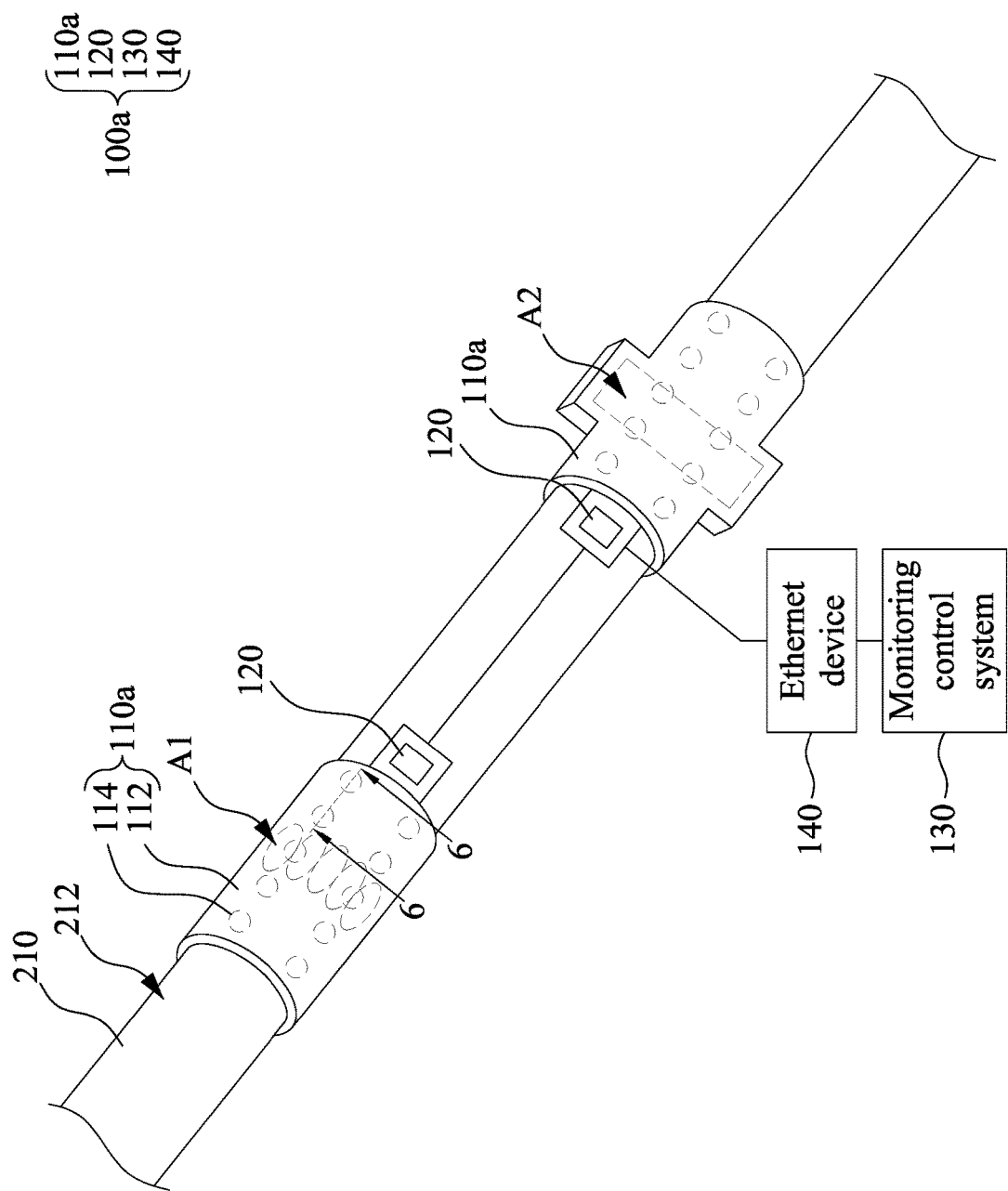
FIG. 4 is a schematic view of a leakage detecting assembly according to another embodiment of the present disclosure.
Figure 5:
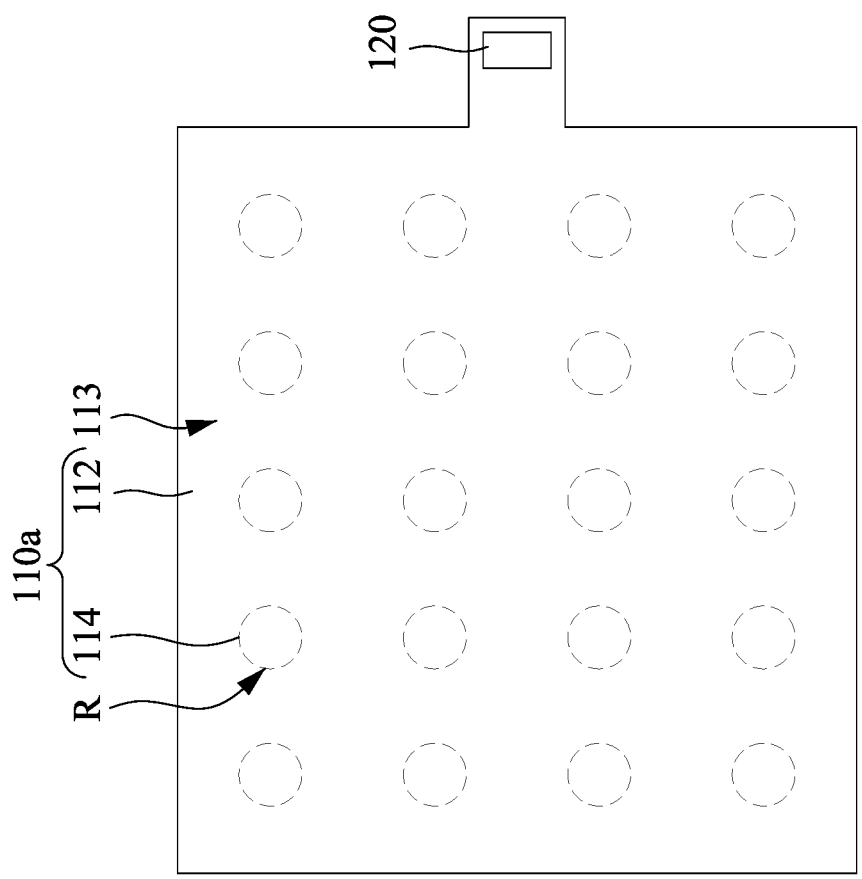
FIG. 5 is a top view of a sheet leakage detecting module of FIG. 4 after being unfolded.

FIG. 4 is a schematic view of a leakage detecting assembly 100a according to another embodiment of the present disclosure. FIG. 5 is a top view of a sheet leakage detecting module 110a of FIG. 4 after being unfolded. As shown in FIG. 4 and FIG. 5, the leakage detecting assembly 100a includes the sheet leakage detecting module 110a, the signal output unit 120, the monitoring control system 130, and the Ethernet device 140. The difference between this embodiment and the embodiment of FIG. 2 is that the sheet leakage detecting module 110a includes an isolation layer 112 and a plurality of leakage detectors 114. The isolation layer 112 surrounds the welding area A 1 or the connection area A 2 of the pipeline 210. The leakage detectors 114 are arranged in the isolation layer 112 in an array arrangement. In some embodiments, the material of the isolation layer 112 may be silicone, which has ductility, expandability, and self-adhesion, and is convenient to be disposed on the pipeline 210.

Since the leakage detectors 114 are arranged in the isolation layer 112 in the array arrangement, each of the leakage detectors 114 may correspond to one position of the pipeline 210. When at least one of the leakage detectors 114 detects gas or liquid leak of the pipeline 210, the monitoring control system 130 may receive feedback signals through the signal output unit 120 and the Ethernet device 140, such that technicians can determine the precise location of where the leak is occurring (i.e., the position of the leakage detector 114 in the array). Such configuration may further obtain the precise position of the leakage of the pipeline 210, which is convenient for the technicians to go to the site for inspection and maintenance.

Figure 6:
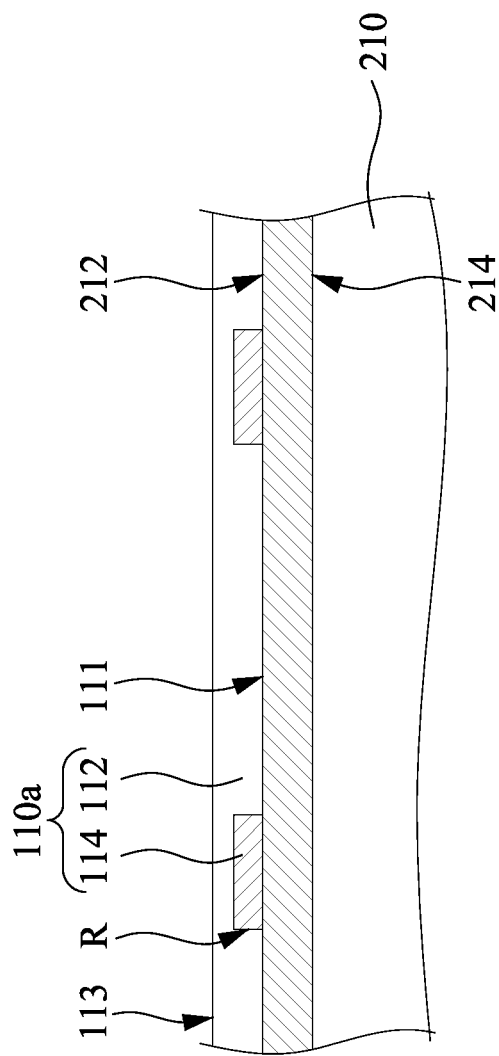
FIG. 6 is a cross-sectional view of the sheet leakage detecting module and a pipeline taken along line 6-6 of FIG. 4.

FIG. 6 is a cross-sectional view of the sheet leakage detecting module 110a and the pipeline 210 taken along line 6-6 of FIG. 4. As shown in FIG. 5 and FIG. 6, the sheet leakage detecting module 110a is disposed along a portion of the outer surface 212 of the pipeline 210, and is in direct contact with the outer surface 212 of the pipeline 210. The body between the outer surface 212 and the inner surface 214 of the pipeline 210 of FIG. 6 is referred to as the pipe wall of the pipeline 210. When gas or liquid leaks from the pipe wall of the pipeline 210, the sheet leakage detecting module 110a in contact with the outer surface 212 of the pipeline 210 can immediately detect the leak. In this embodiment, the isolation layer 112 of the sheet leakage detecting module 110a surrounds the leakage detectors 114. The isolation layer 112 has an inner surface 111 and an outer surface 113, the inner surface 111 has a plurality of recesses R which are blind holes and are covered by the outer surface 113. The leakage detectors 114 are respectively in the recesses R of the isolation layer 112 and are covered by the outer surface 113 of the isolation layer 112. The recesses R of the isolation layer 112 are arranged in an array arrangement. Accordingly, when the recesses R accommodate the leakage detectors 114, the leakage detectors 114 may be in the array arrangement.

Figure 7:
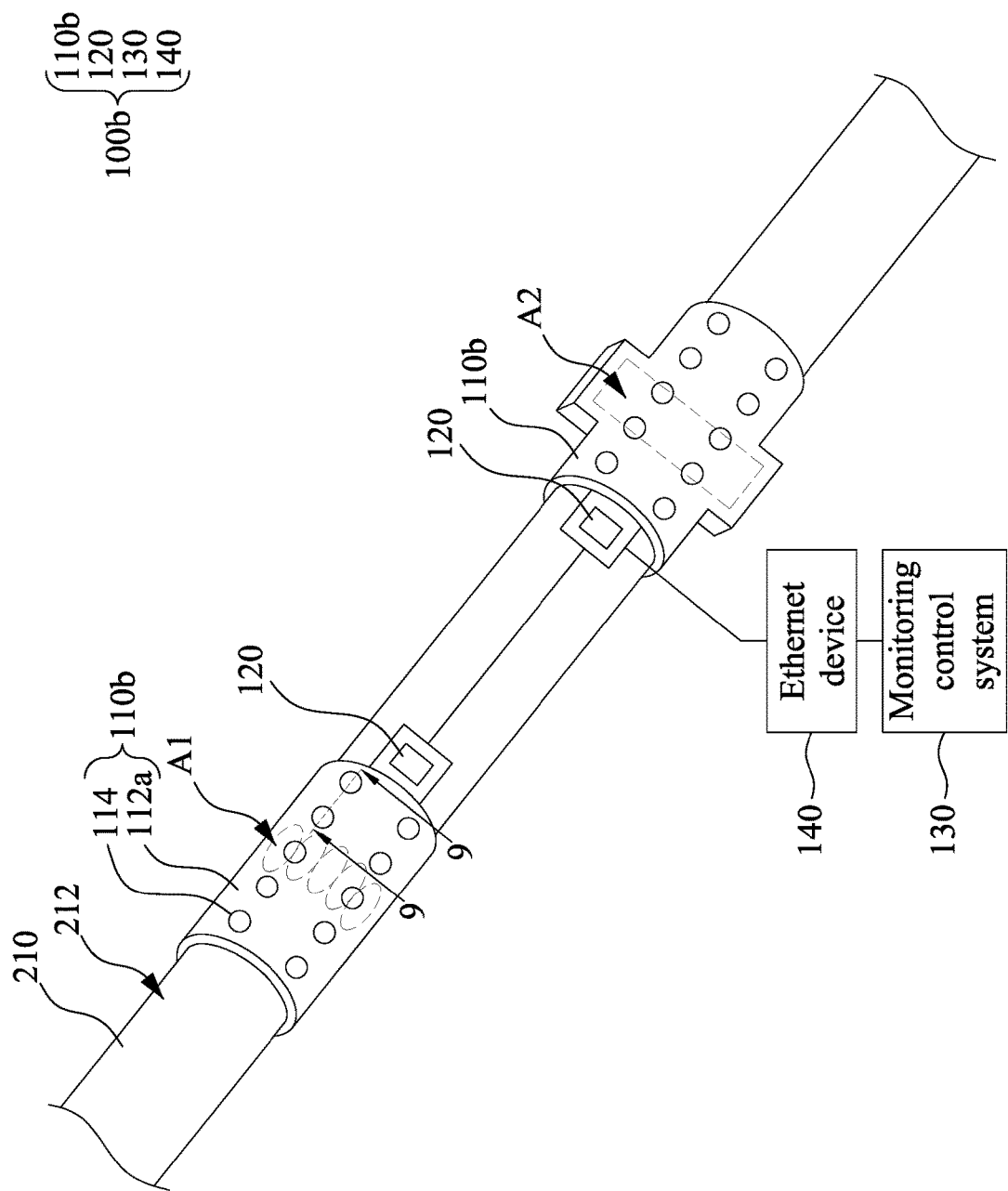
FIG. 7 is a schematic view of a leakage detecting assembly according to another embodiment of the present disclosure.
Figure 8:
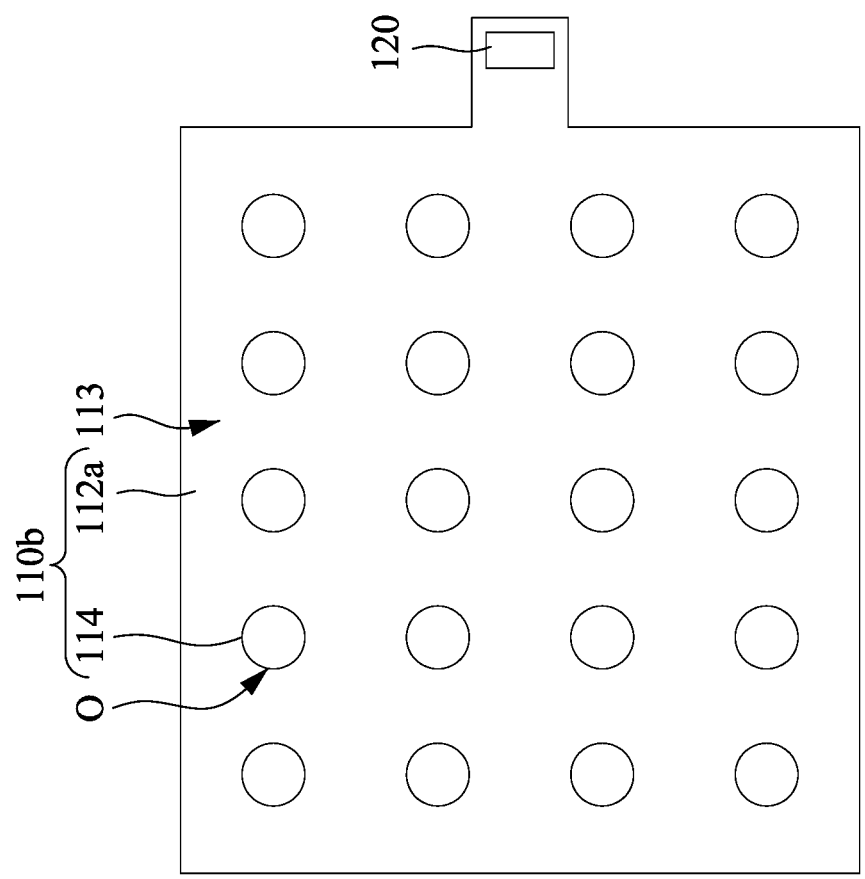
FIG. 8 is a top view of a sheet leakage detecting module of FIG. 7 after being unfolded.

FIG. 7 is a schematic view of a leakage detecting assembly 100b according to another embodiment of the present disclosure. FIG. 8 is a top view of a sheet leakage detecting module 110b of FIG. 7 after being unfolded. As shown in FIG. 7 and FIG. 8, the leakage detecting assembly 100b includes the sheet leakage detecting module 110b, the signal output unit 120, the monitoring control system 130, and the Ethernet device 140. The difference between this embodiment and the embodiment of FIG. 5 is that the leakage detectors 114 of the sheet leakage detecting module 110b are exposed through the outer surface 113 of the isolation layer 112a. The isolation layer 112a surrounds the welding area A 1 or the connection area A 2 of the pipeline 210. The leakage detectors 114 are arranged in the isolation layer 112a in the array arrangement. In some embodiments, the material of the isolation layer 112a may be silicone, which has ductility, expandability, and self-adhesion, and is convenient to be disposed on the pipeline 210.

Since the leakage detectors 114 are arranged in the isolation layer 112a in the array arrangement, each of the leakage detectors 114 may correspond to one position of the pipeline 210. When at least one of the leakage detectors 114 detects gas or liquid leak of the pipeline 210, the monitoring control system 130 may receive feedback signals through the signal output unit 120 and the Ethernet device 140, such that technicians can determine the precise location of where the leak is occurring (i.e., the position of the leakage detector 114 in the array). Such configuration may further obtain the precise position of the leakage of the pipeline 210, which is convenient for the technicians to go to the site for inspection and maintenance.

Figure 9:
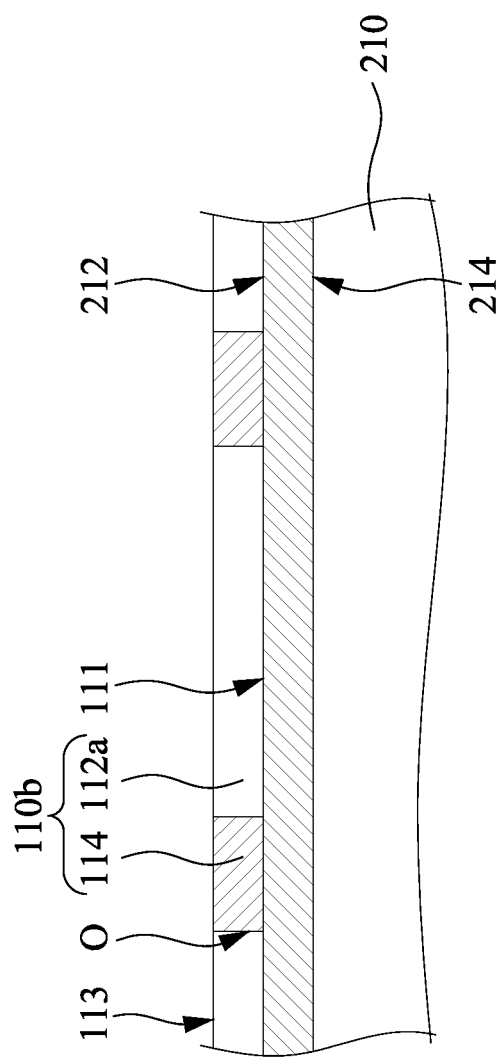
FIG. 9 is a cross-sectional view of the sheet leakage detecting module and a pipeline taken along line 9-9 of FIG. 7.

FIG. 9 is a cross-sectional view of the sheet leakage detecting module 110b and the pipeline 210 taken along line 9-9 of FIG. 7. As shown in FIG. 8 and FIG. 9, the sheet leakage detecting module 110b is disposed along a portion of the outer surface 212 of the pipeline 210, and is in direct contact with the outer surface 212 of the pipeline 210. The body between the outer surface 212 and the inner surface 214 of the pipeline 210 of FIG. 9 is referred to as the pipe wall of the pipeline 210. When gas or liquid leaks from the pipe wall of the pipeline 210, the sheet leakage detecting module 110b in contact with the outer surface 212 of the pipeline 210 can immediately detect the leak. In this embodiment, the isolation layer 112a of the sheet leakage detecting module 110b surrounds the leakage detectors 114. The isolation layer 112a has the inner surface 111 and the outer surface 113 opposite to the inner surface 111, and has a plurality of openings O through the inner surface 111 and the outer surface 113. The openings O are through holes and are not covered by the outer surface 113. The leakage detectors 114 are respectively in the openings O of the isolation layer 112a and are exposed from the outer surface 113 of the isolation layer 112a. The openings O of the isolation layer 112a are arranged in an array arrangement. Accordingly, when the openings O accommodate the leakage detectors 114, the leakage detectors 114 may be in the array arrangement.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A leakage detecting assembly, comprising:
a sheet leakage detecting module covering a welding area or a connection area of a pipeline and surrounding the pipeline, wherein the sheet leakage detecting module is in direct contact with an outer surface of the pipeline, the sheet leakage detecting module comprises an isolation layer and a plurality of leakage detectors, the isolation layer surrounds the welding area or the connection area of the pipeline, the leakage detectors are arranged in the isolation layer in an array arrangement, top surfaces of the leakage detectors are coplanar with an outer surface of the isolation layer, a thickness of each of the leakage detectors is the same as a thickness of the isolation layer, and bottom surfaces of the leakage detectors and an inner surface of the isolation layer are in direct contact with the outer surface of the pipeline;
a signal output unit electrically connected to the sheet leakage detecting module; and
a monitoring control system electrically connected to the signal output unit.

2. The leakage detecting assembly of claim 1, wherein the isolation layer surrounds the leakage detectors.

3. The leakage detecting assembly of claim 1, wherein a material of the isolation layer is silicone.

4. The leakage detecting assembly of claim 1, wherein the isolation layer has a plurality of openings through the inner surface and the outer surface of the isolation layer, and the leakage detectors are respectively in the openings.

5. The leakage detecting assembly of claim 4, wherein the openings of the isolation layer are arranged in an array arrangement.

6. The leakage detecting assembly of claim 4, wherein the leakage detectors are exposed through the outer surface of the isolation layer.

7. The leakage detecting assembly of claim 1, further comprising:
an Ethernet device electrically connected to the signal output unit and the monitoring control system.

8. A sheet leakage detecting module, comprising:
an isolation layer surrounding a welding area or a connection area of a pipeline, wherein the isolation layer is in direct contact with an outer surface of the pipeline; and
a plurality of leakage detectors arranged in the isolation layer in an array arrangement, wherein the isolation layer surrounds the welding area or the connection area of the pipeline, top surfaces of the leakage detectors are coplanar with an outer surface of the isolation layer, a thickness of each of the leakage detectors is the same as a thickness of the isolation layer, and bottom surfaces of the leakage detectors and an inner surface of the isolation layer are in direct contact with the outer surface of the pipeline.

9. The sheet leakage detecting module of claim 8, wherein the isolation layer surrounds the leakage detectors.

10. The sheet leakage detecting module of claim 8, wherein a material of the isolation layer is silicone.

11. The sheet leakage detecting module of claim 8, wherein the isolation layer has a plurality of openings through the inner surface and the outer surface of the isolation layer, and the leakage detectors are respectively in the openings.

12. The sheet leakage detecting module of claim 11, wherein the openings of the isolation layer are arranged in an array arrangement.

13. The sheet leakage detecting module of claim 11, wherein the leakage detectors are exposed through the outer surface of the isolation layer.

* * * * *